United States Patent [19]
Poix et al.

[11] Patent Number: 6,051,820
[45] Date of Patent: Apr. 18, 2000

[54] HEATED, MULTI-PANE, GLASS SHEETS OF DIFFERENT SIZES WITH CURRENT LINES LOCATED OUTSIDE OF VACUUM SEAL

[75] Inventors: Rene Poix, Noyon; Yves Demars, Clermont, both of France

[73] Assignee: Saint-Gobain Vitrage, Courbevoie, France

[21] Appl. No.: 09/126,776

[22] Filed: Jul. 31, 1998

[30] Foreign Application Priority Data

Jul. 31, 1997 [FR] France .................................. 97 09772
Oct. 6, 1997 [FR] France .................................. 97 12409

[51] Int. Cl.[7] .................................................. H05B 3/06
[52] U.S. Cl. .......................... 219/522; 219/548; 219/202; 219/203
[58] Field of Search .................................. 219/202, 203, 219/219, 522, 548

[56] References Cited

U.S. PATENT DOCUMENTS

| | | | |
|---|---|---|---|
| 3,263,063 | 7/1966 | Marriott et al. | 219/522 |
| 3,379,859 | 4/1968 | Marriott | 219/522 |
| 3,475,594 | 10/1969 | Aisanich | 219/509 |
| 3,489,884 | 1/1970 | Waseleski | 219/522 |
| 3,524,920 | 8/1970 | Stromquist et al. | 174/68.5 |
| 3,526,753 | 9/1970 | Aisanich et al. | 219/522 |
| 3,655,939 | 4/1972 | Stromquist . | |
| 3,911,245 | 10/1975 | O'Shaughnessy . | |
| 5,256,858 | 10/1993 | Tomb . | |

FOREIGN PATENT DOCUMENTS 2 292 581   2/1996   United Kingdom .

Primary Examiner—Teresa Walberg
Assistant Examiner—Shawntina Fuqua
Attorney, Agent, or Firm—Oblon, Spivak, McClelland, Maier & Neustadt, P.C.

[57] ABSTRACT

An insulating glazed element composed of at least two glass sheets separated from each other by a small space in which a vacuum has been created is provided with a heating element on an internal face of at least one of the glass sheets. Two current supply collecting lines are positioned on at least part of the internal face of the at least one of said glass sheets. The heating element includes at least one conductive layer deposited on at least part of the internal face of the at least one of the glass sheets. The conductive layer extends between the two current supply collecting lines.

10 Claims, 3 Drawing Sheets

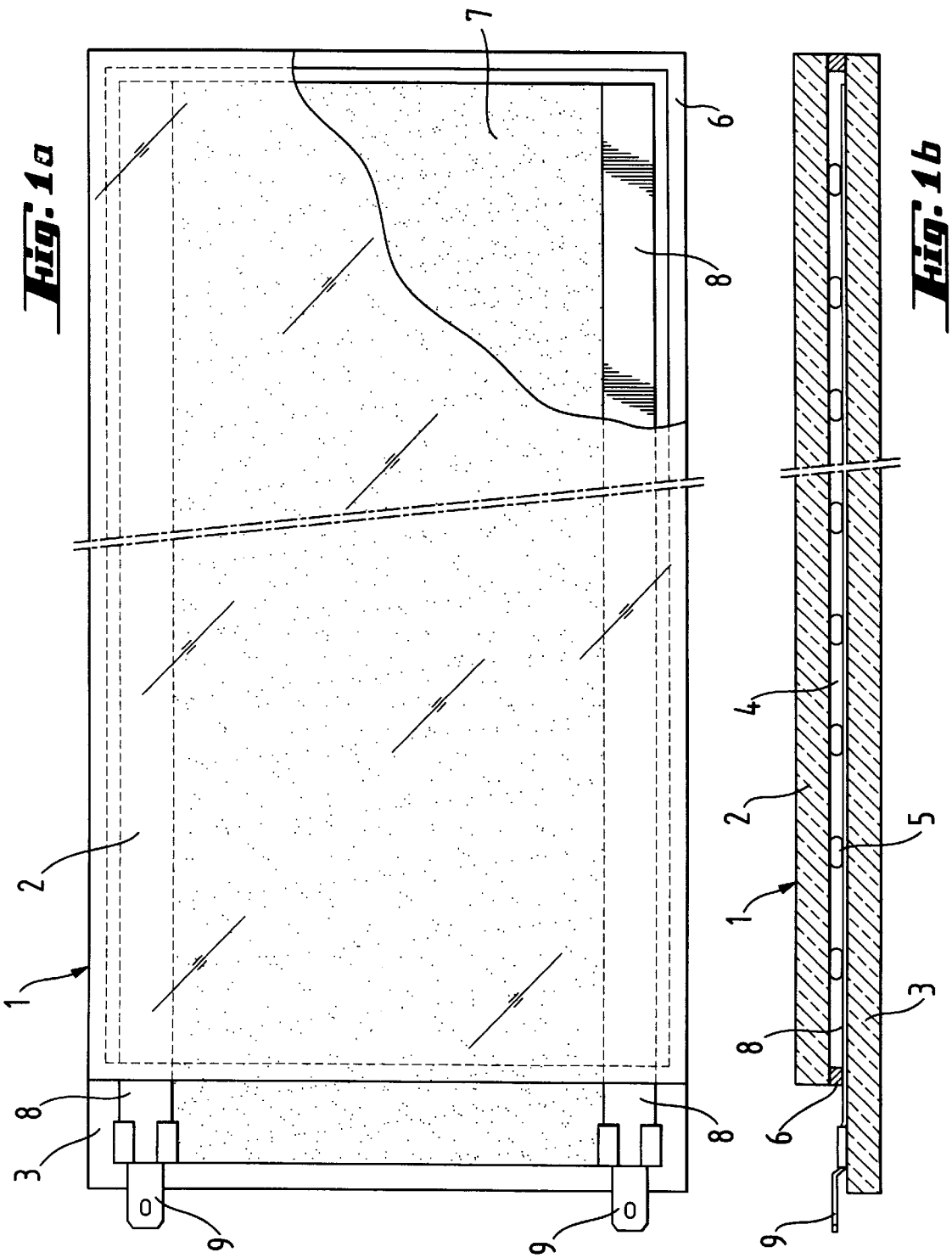

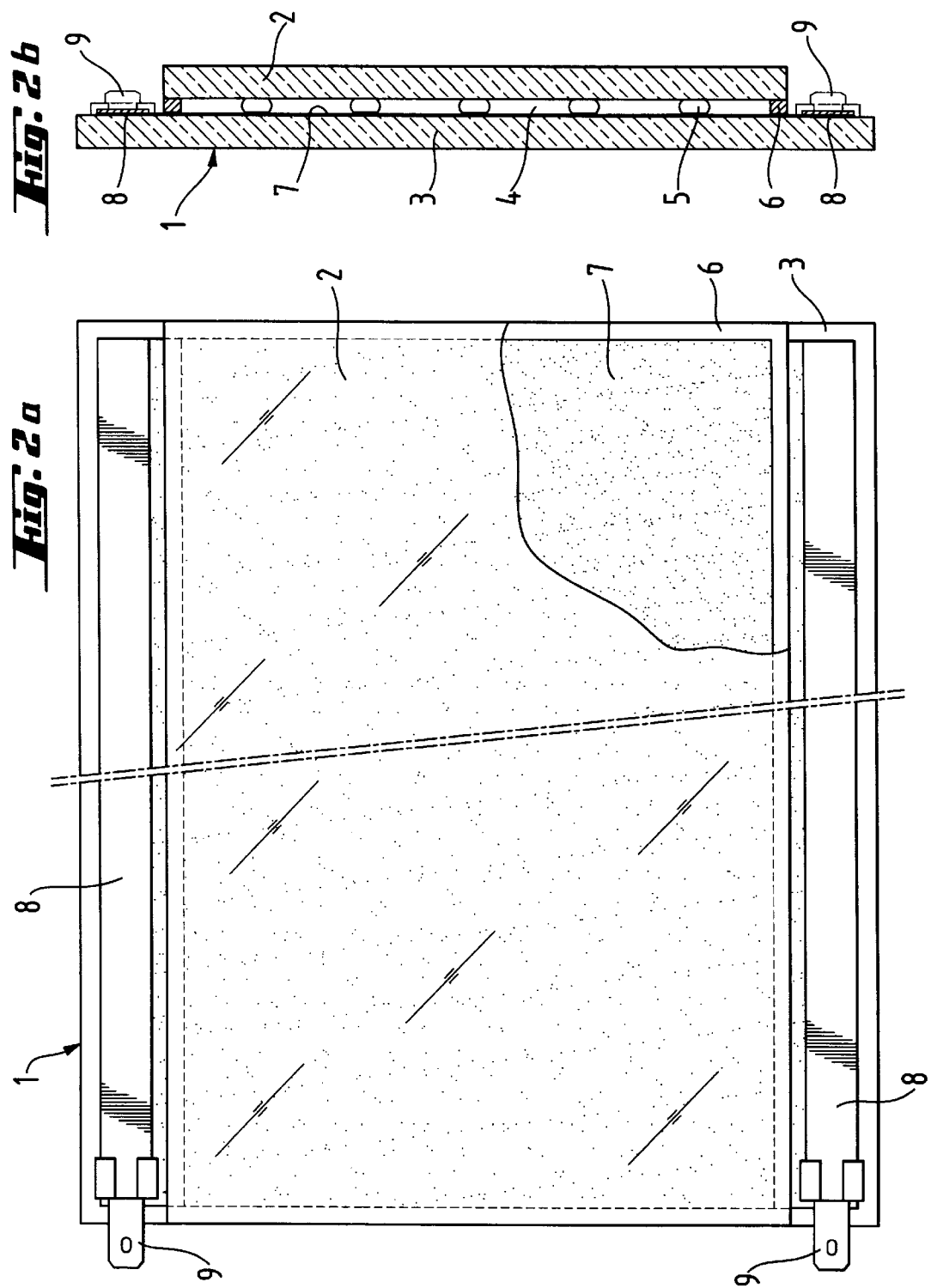

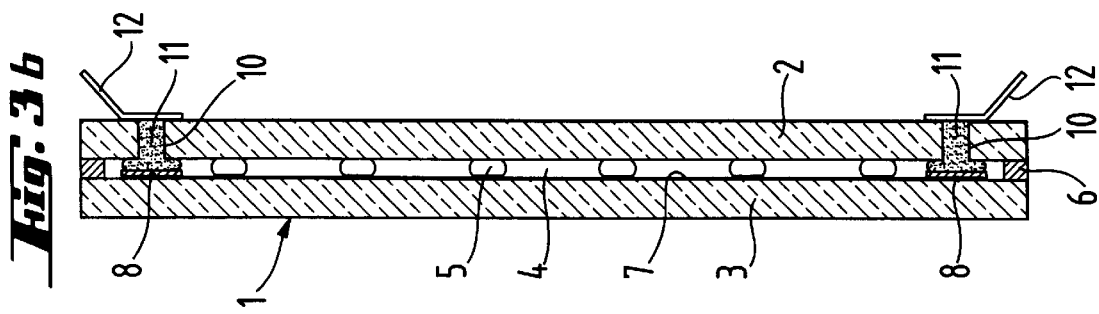
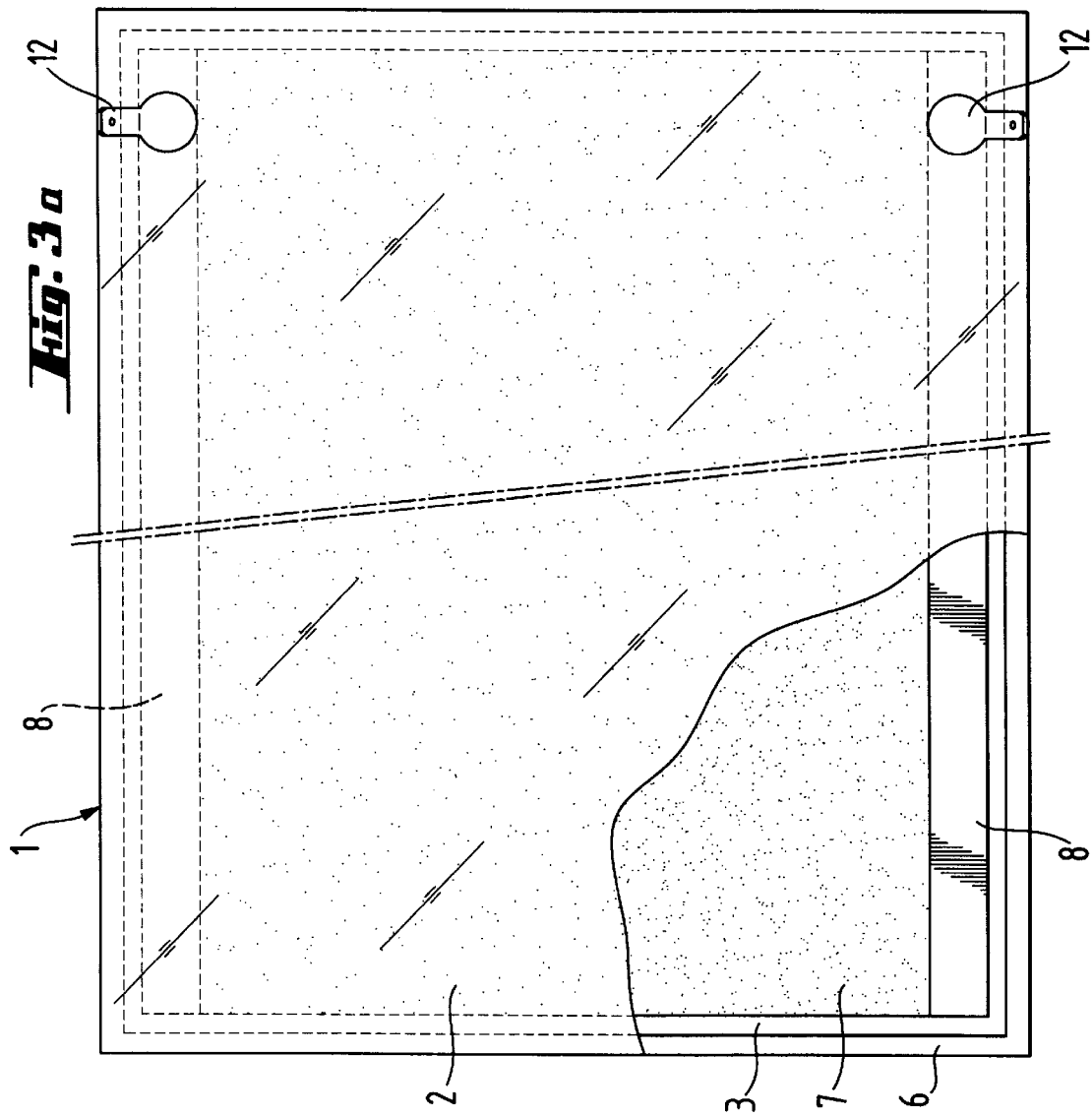

HEATED, MULTI-PANE, GLASS SHEETS OF DIFFERENT SIZES WITH CURRENT LINES LOCATED OUTSIDE OF VACUUM SEAL

BACKGROUND OF THE INVENTION

1. Field of the Invention

The invention relates to elements composed of insulating glazed elements composed of at least two glass sheets separated from each other by a small space in which a vacuum has been created.

2. Description of the Related Art

In order to obtain thermal and acoustic insulation, it is usual to produce insulating glazing assemblies comprising two glass sheets separated from each other by a relatively large air cavity. Such glazing assemblies provide thermal insulation which is regarded as unsatisfactory for certain applications. To remedy this, it is known to produce glazing assemblies comprising three glass sheets, it being possible for one of the air cavities to be replaced with a gas, for example krypton. These glazing assemblies have markedly improved thermal insulation properties but have such a thickness that it is not always easy to use them. Moreover, users are currently demanding the thermal insulation properties of glazing assemblies to be equivalent to that of solid partitions, i.e., walls.

Insulating glazing assemblies have already been proposed, especially in EP-A-0,645,516, which consist of two glass sheets separated from each other by a small space in which a vacuum has been created. The glass sheets are separated from each other by mounts distributed over their entire surfaces, the sheets being joined together around their periphery by an inorganic seal.

Because of the vacuum, these glazing assemblies provide very good insulation, but because of this very good insulation they may rapidly be covered with condensation, or even frost, for example when there is a rapid increase in the temperature of the ambient air. This is because there is no heat transfer between the two glass sheets constituting the glazing assembly due to the vacuum created between the two glass sheets. Each glass sheet is therefore at the temperature of the ambient air towards which it faces and their respective temperatures do not affect each other, unlike in the usual insulating glazing assemblies. Upon a rapid increase in the temperature of the ambient air, that face of the glazing assembly oriented towards the ambient air does not heat up rapidly and may thus be at a temperature below the temperature of the dew point of this ambient air, hence the appearance of condensation, or even of frost if the temperature of the glass sheet is very low. A rapid increase in the temperature of the ambient air should be understood to mean an increase in temperatures whose rate of change is substantially greater than the consequent rate of change of the temperature of the glass sheet in contact with this ambient air.

Thus, despite their very good insulation, these types of insulating glazing assemblies lose their primary function in certain applications such as, for example, a door of a refrigerating enclosure after the door has been opened. That is to say they no longer fulfil their function of providing visibility through the wall because of this temporary loss of transparency.

SUMMARY OF THE INVENTION

It is an object of the invention is to produce an insulating glazed element composed of at least two glass sheets separated from each other by a small space in which a vacuum has been created, which makes it possible to limit the appearance of condensation or of frost.

In furtherance of this and other objects, the invention provides a glazed element having at least two glass sheets between which a vacuum has been created, the sheets being separated from each other by mounts distributed over the entire surface and being joined together around their periphery by an inorganic seal, the glazed element being provided with at least one heating element on at least one face of at least one glass sheet of the said glazed element. In this way, it is possible to heat the glass sheet provided with the heating element to a temperature above the temperature of the dew point of the ambient air in contact with this sheet. Any condensation or frost is thus prevented from appearing, and the glazed element retains its transparent character. In addition, because of the good thermal insulation performance of the element, it is possible to produce a glazing assembly with only one face heated or with both faces heated, depending on the intended applications.

According to a preferred embodiment, at least one conductive layer is deposited on at least part of at least one internal face of the glazed element and extends between two current supply collecting lines. An internal face should be understood to mean a face in contact with the vacuum. Advantageously, by depositing a conductive layer on an internal face, any subsequent possible degradation, for example by excessively aggressive cleaning of the glazed element, is avoided.

Advantageously, the conductive layer is a low-emissivity conductive layer of a metal oxide such as, for example, a layer of fluorine-doped tin oxide deposited by chemical vapor deposition (CVD) or a layer of metal such as, for example, a vacuum-deposited silver-based layer, it being possible for this layer to contribute to the thermal insulation function.

According to an advantageous embodiment of the invention, the two internal faces of the said glazed element are coated with at least one conductive layer and the mounts in contact with these layers are made of an electrically conductive material. A mount is understood to mean the combination consisting of the spacer itself and the element for adhesively bonding this spacer to the glass sleets, if there is such an element. This embodiment has the advantage of heating both glass sheets of the glazed element by means of a single pair of collecting lines which are, for example, arranged on one of the glass sheets. According to this example, the first glass sheet is heated conventionally, the electric current flowing between the two collecting lines, and the second glass sheet is heated due to the electric current passing through the mounts distributed over the entire surface of the conductive layer extended between the two collecting lines.

The production of such an insulating glazed element having a conductive layer on at least one internal face of the glazed element is far from obvious to those skilled in the art. This is because insulating glazing assemblies consisting of at least two glass sheets separated from each other by a small space inside which a vacuum has been created must ensure that the assembly remains sealed over time without question. Thus, the formation of ajoint between the space where the vacuum has been created and the outside, such as, for example, an electrical joint, creates a region where the assembly's sealing may be weakened, thereby impairing the value of the insulating glazing assembly.

In order to alleviate this sealing retention problem, the inventors have developed various types of insulating glazed elements having a heating layer on an internal face of the glazed element. According to a first embodiment of the invention, the glazed element consists of at least two glass sheets of different sizes and the collecting lines are placed on the larger glass sheet and pass through the seal of the glazed element. In this way, it is possible to connect the collecting lines to the current supply circuit outside the space where the vacuum has been created without disturbing the construction of the glazed element itself, i.e., by not creating regions where the sealing of the assembly may be put into question. This is because the collecting lines are advantageously made of an electrically conductive composition based on a silver paste and are deposited directly on the glass sheet by a screen printing process. Thus, the fact that the lines pass through the seal which is made of an inorganic composition does not weaken the sealing between the two glass sheets. These collecting lines therefore do not disturb the sealing of the assembly.

According to a second embodiment of the invention, the glazed element consists of at least two glass sheets of different sizes, and the collecting lines are placed on the larger glass sheet outside the space where the vacuum has been created. This embodiment has the advantage of not modifying the construction of the insulating glazed element while providing the possibility of heating the region around the seal, which region is sensitive to heat transfer.

According to a third embodiment of the invention, the glazed element consists of a glass sheet having two plugged through-holes, these holes being respectively positioned opposite the two collecting lines placed on the other sheet and making electrical connection with the collecting lines. This embodiment has the advantage of producing a glazed element whose glass sheets are of the same size and of providing, optionally, a dual purpose at the pumping orifice. This is because, after pumping out the gas between the sheets, the holes are plugged with a conductive material such as, for example, a tin alloy, which comes into contact with the facing collecting line and which is linked to an electrical supply device.

Advantageously and independently of the connection of the collecting lines via these plugged holes, the inventors have been able to demonstrate that the presence of two through-holes makes it possible to pump out in a uniform manner, in particular in the case of large glazed elements.

According to several variants of the invention, the insulating glazed element is also provided with at least one heating element near its seal. In this way, heating this particularly heat-transfer-sensitive region makes it possible, should it be necessary, to avoid or prevent the formation of condensation when there is a large temperature variation between the two atmospheres separated by the insulating glazed element.

According to a first variant of the invention, a heating lead is embedded in the seal of the glazed element. This embodiment has the advantage of being aesthetically attractive and easy to produce.

According to a second variant of tile invention, the seal of the said glazed element is electrically conductive and is provided with two connectors. This embodiment has the advantage of not modifying the mechanical properties nor the strength of the seal.

According to a third variant of the invention, a conductive layer is deposited near the seal or at least one internal face of the glazed element.

According to an embodiment of the invention, the conductive layer is a layer based on a silver paste deposited by screen printing and, according to another embodiment of the invention, the conductive layer is a thin metal oxide layer such as, for example, a fluorine-doped tin oxide layer deposited by CVD.

BRIEF DESCRIPTION OF THE DRAWINGS

Further details and advantageous characteristics will emerge below from the description of illustrated embodiments of the invention, wherein:

FIG. 1a shows a front view of an insulating glazed element according to the invention;

FIG. 1b shows a horizontal section of the insulating glazed element shown in FIG. 1a;

FIG. 2 shows a front view of another type of insulating glazed element according to the invention;

FIG. 2b shows a vertical section of the insulating glazed element shown in FIG. 2a;

FIG. 3a shows a front view of a third type of insulating glazed element according to the invention; and FIG. 3b shows a horizontal section of the insulating glazed element according to the invention.

DESCRIPTION OF THE PREFERRED EMBODIMENTS

For the sake of clarity, it should be pointed out that not all the figures strictly respect the proportions between the various elements illustrated.

The insulating glazed element 1 consists of two toughened glass sheets 2 and 3 separated by a space 4 at a vacuum. The sheets are separated from each other by mounts 5 distributed over the entire surface and are joined together around their periphery by an inorganic seal 6.

According to this illustration, the glass sheet 3 is coated on its internal face with a thin low-emissivity conductive metal layer 7 deposited, for example, by pyrolysis and extending between two parallel collecting lines 8.

This thin conductive metal layer 7 is a layer such as, for example, a fluorine-doped tin oxide layer, and has a geometrical thickness of between 180 and 350 nanometers and a surface resistance of less than or equal to 50 ohms per square and preferably of less than or equal to 20 ohms per square. It forms a heating element which heats the glazing when an electrical current is passed through the layer 7 via the collecting lines 8.

The collecting strips 8 are based on an electrically conductive composition made of a pasty suspension in a binder, of a metallic silver composition and of a glass frit. They are generally deposited directly on the glass sheet by a screen printing process and fired during the heat treatment which precedes the step of toughening the glass.

The mounts 5 have a thickness of 0.2 millimeters and a diameter of 0.4 millimeters. They are distributed over the entire surface of the glass sheets and are separated from each other by 30 millimeters.

The mounts 5 are deposited on one of the glass sheets 2 and 3 after the glass sheet 3 has been coated with the thin metal layer 7 and with the collecting strips 8, and after the two glass sheets 2 and 3 have been toughened. After depositing a glass frit bead 6 around the periphery of the glass sheet 2, the two glass sheets 2 and 3 are assembled and a heat treatment is carried out on the assembly in order to produce the fusion bond between the two glass sheets 2 and 3, the frit 6 forming a seal sealing the assembly. A vacuum is then created between the two glass sheets 2 and 3 using any means known to those skilled in the art, such as, for example, the process described in French Patent Application filed in the name of Saint-Gobain Vitrage under the number 96/09632.

FIGS. 1a and 1b illustrate a first embodiment of an insulating glazed element according to the invention. According to this embodiment, the glass sheet 2 has a smaller size than the glass sheet 3 so that, once the two glass sheets 2 and 3 are joined together, only one edge of the glass sheet 3 projects from the assembly. The two collecting lines 8 extend in a parallel manner inside the space where the vacuum has been created, each along one edge of the assembly, so that the two collecting lines pass through the seal on the side where the glass sheet 3 projects from the assembly. At the projecting edge of the glass sheet 3, connectors 9 are fixed to the collecting lines 8, it being possible for the connectors 9 to be, for example, connectors of the type used for the heated rear windows of motor vehicles.

Because of the composition of the collecting lines, this embodiment has the advantage of not weakening the seal at the point where the collecting lines pass through the latter and thus makes it possible to connect them to an easy-access electrical supply device.

FIGS. 2a and 2b illustrate a second embodiment of the insulating glazed element according to the invention. According to this embodiment, the glass sheet 2 has a smaller size than the glass sheet 3 so that, once the two glass sheets have been joined together, the glass sheet 3 has two parallel projecting parts. The two collecting lines 8 are each placed respectively on one of the two projecting parts, that is to say outside the space where the vacuum has been created. Each collecting line 8 is linked to a connector 9, allowing it to be connected to an electrical supply device. This type of glazed element has the advantage of not modifying the structure incorporating the space where the vacuum has been created.

FIGS. 3a and 3b illustrate a third embodiment of the insulating glazed element according to the invention. According to this embodiment, the two glass sheets 2 and 3 have the same size and the glass sheet 2 has two through-holes 10, each positioned opposite a collecting line 8. After the vacuum has been created, the two holes are plugged using a conductive metal alloy 11 such as, for example, a tin alloy, which comes into contact with the collecting line 8. A connector 12, for example of the lug type, is then fixed at the plugged holes 10 so as to allow connection onto an electrical supply device. This type of insulating glazed element has the advantage of being particularly aesthetically attractive because its surface is almost uniform.

The various embodiments of insulating glazed elements thus described are easy to produce and make it possible to connect a heating layer deposited on at least one internal face without weakening the glazed element itself, and in particular without creating a sensitive region where the sealing of the assembly could be brought into question. The glazed elements thus provide excellent thermal insulation while at the same time maintaining their transparency, whatever the conditions under which they are used.

The invention is not limited to these embodiments and must be interpreted in a non-limiting manner and as encompassing all types of insulating glazed elements consisting of at least two glass sheets between which a vacuum has been created, and provided with at least one heating element on at least part of at least one glass sheet.

What is claimed is:

1. An insulating glazed element comprising:
   two glass sheets of different sizes and separated from each other by mounts;
   an inorganic seal about the periphery of the sheets so as to join the sheets together and to form a vacuum space between internal faces of the two glass sheets;
   at least one heating element positioned on at least part of the internal face of at least one of said glass sheets; and
   two current supply collecting lines on at least part of the internal face of the larger one of said glass sheets, wherein said collecting lines pass through said seal.

2. The insulating glazed element according to claim 1, wherein said at least one heating element comprises at least one conductive layer deposited on said at least part of the at least one internal face of the at least one of said glass sheets, wherein said at least one conductive layer extends between said two current supply collecting lines.

3. The insulating glazed element according to claim 2, wherein said conductive layer is a low-emissivity conductive layer based on a metal.

4. The insulating glazed element according to claim 2, wherein two internal faces of the said glazed element are coated with at least one conductive layer, and wherein at least some of the mounts are in contact with said layers and are made of electrically conductive materials.

5. An insulating glazed element comprising:
   two glass sheets of different sizes and separated from each other by mounts;
   an inorganic seal about the periphery of the sheets so as to join the sheets together and to form a vacuum space between internal faces of the two glass sheets;
   at least one heating element positioned on at least part of the internal face of at least one of said glass sheets; and
   two current supply collecting lines on at least part of the internal face of the larger one of said glass sheets outside the vacuum space.

6. An insulating glazed element comprising:
   two glass sheets of different sizes and separated from each other by mounts;
   an inorganic seal about the periphery of the sheets so as to join the sheets together and to form a vacuum space between internal faces of the two glass sheets;
   at least one heating element positioned on at least part of the internal face of at least one of said glass sheets;
   two current supply collecting lines on at least part of the internal face of the larger one of said glass sheets;
   two plugged holes passing through the smaller of said two glass sheets at locations facing the collecting lines, and a conductive material plugging the two plugged holes, said conductive material making electrical connection with the collecting lines.

7. The insulating glazed element according to claim 1, further comprising an electrical lead embedded in said seal.

8. The insulating glazed element according to claim 2, wherein said inorganic seal is electrically conductive and provided with two connectors.

9. The insulating glazed element according to claim 1, further comprising a conductive layer deposited around the periphery of at least one internal face of at least one of said glass sheets.

10. The insulating glazed element according to claim 2, wherein said conductive layer is a low-emissivity conductive layer based on a metal.

* * * * *